United States Patent

[11] 3,543,944

[72] Inventors Frank G. Woodside
1751 E. Fox Lane, Milwaukee, Wisconsin 53217;
Richard F. Uren, Bowling Green, Ohio
[21] Appl. No. 643,637
[22] Filed June 5, 1967
[45] Patented Dec. 1, 1970
[73] Assignee
Said Uren assignor to said Woodside.

[54] VEHICLE MOUNTED HOIST
4 Claims, 17 Drawing Figs.
[52] U.S. Cl. .................................................. 212/66,
212/35, 212/55, 212/59, 212/145
[51] Int. Cl. ...................................................... B66c 23/84
[50] Field of Search .......................................... 212/30–
—35, 28, 54, 55, 58, 59, 66—68, 144, 145;
308/230

[56] References Cited
UNITED STATES PATENTS
2,588,928  3/1952  Humpal ....................... 212/35(HC)UX
2,645,360  7/1953  Raymond .................... 212/34
2,712,878  7/1955  Sutton ........................ 212/35(HC)UX
2,774,483  12/1956  Raymond .................... 212/35
2,961,102  11/1960  Pitman ....................... 212/35
3,024,920  3/1962   Sundin ....................... 212/35
3,051,323  8/1962   Kuhlenschmidt ............ 212/35(HC)UX
3,112,035  11/1963  Knight ........................ 212/35
3,154,199  10/1964  Bacogh ...................... 212/35
3,191,780  6/1965   Updegrave ................. 212/66
3,214,033  10/1965  Nilsson ...................... 212/55
3,300,060  1/1967   Lado ......................... 212/55
3,338,425  8/1967   Schneider ................... 212/66
3,402,822  9/1968   Oyen .......................... 308/230

FOREIGN PATENTS
175,300   5/1961   Sweden ...................... 212/35

Primary Examiner—Harvey C. Hornsby
Attorney—Wheeler, Wheeler, House & Clemency

ABSTRACT: A box frame reinforced by the walls of oil reservoirs has a prefabricated tubular core sleeve on which mast bearings are assembled in inherent alinement. The structure of the main and jib booms is such as to yield high ratio of strength in relation to weight and the tying of the hinge points of the boom and operating cylinder to each other as well as to the mast gives stability. A worm gear connected to the lower end of the mast provides for 360° rotation accommodated by swiveled hydraulic manifold connections. The stabilizer legs are not only strong per se but brace the hoist frame.

INVENTORS
FRANK G. WOODSIDE
RICHARD F. UREN

BY Wheeler, Wheeler, House & Clemency
ATTORNEYS

Patented Dec. 1, 1970
3,543,944
Sheet 2 of 6
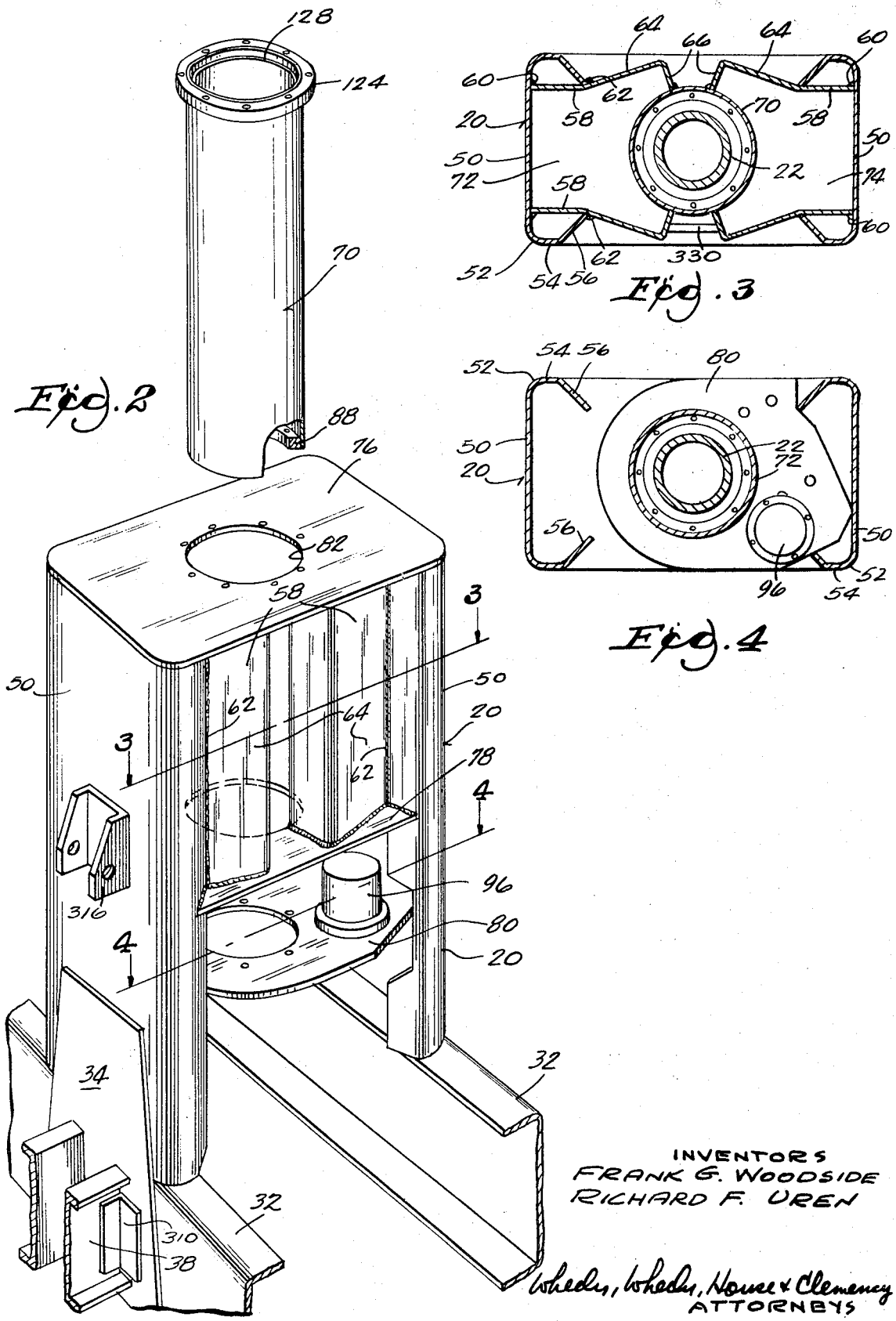
INVENTORS
FRANK G. WOODSIDE
RICHARD F. UREN
Wheeler, Wheeler, House & Clemency
ATTORNEYS

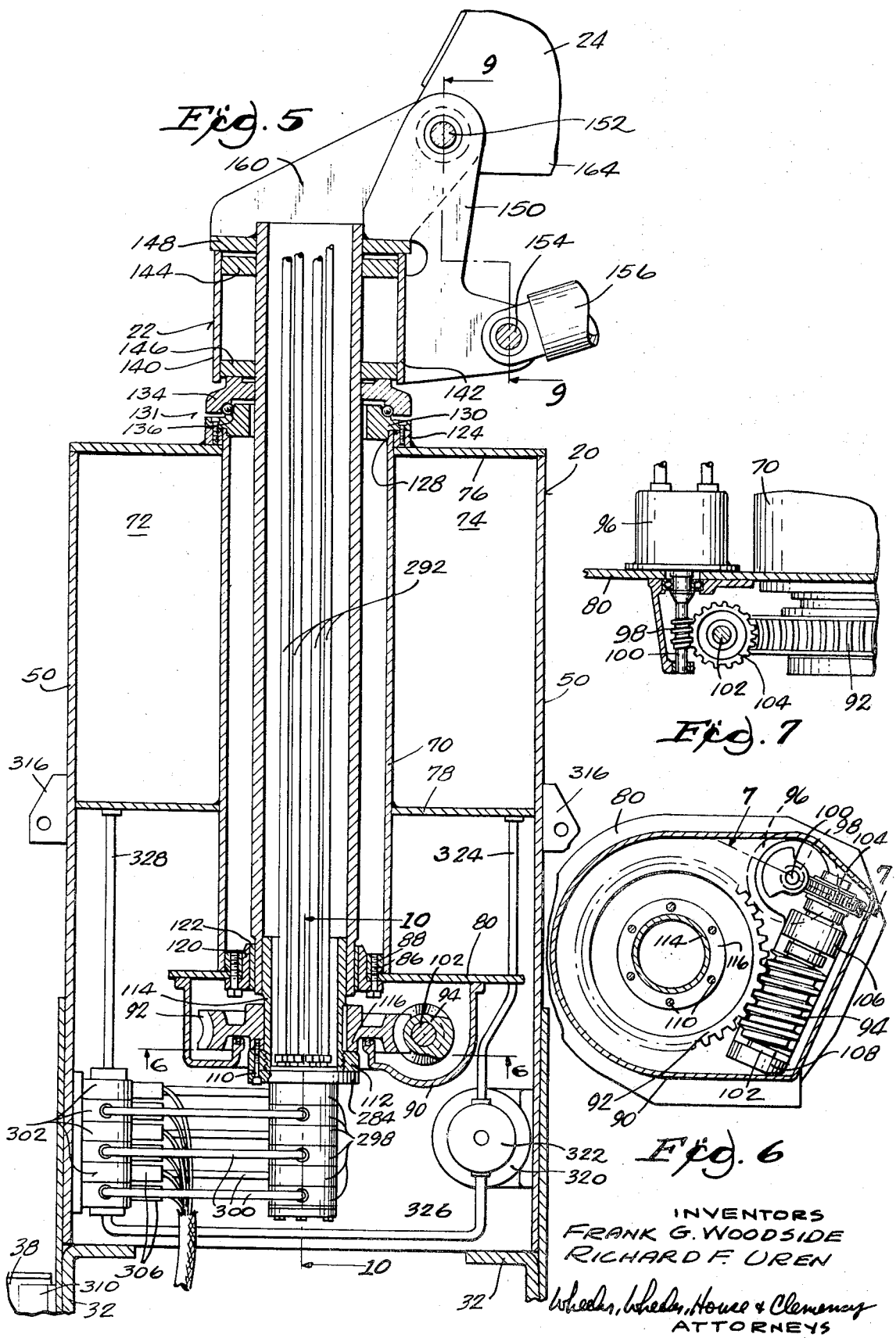

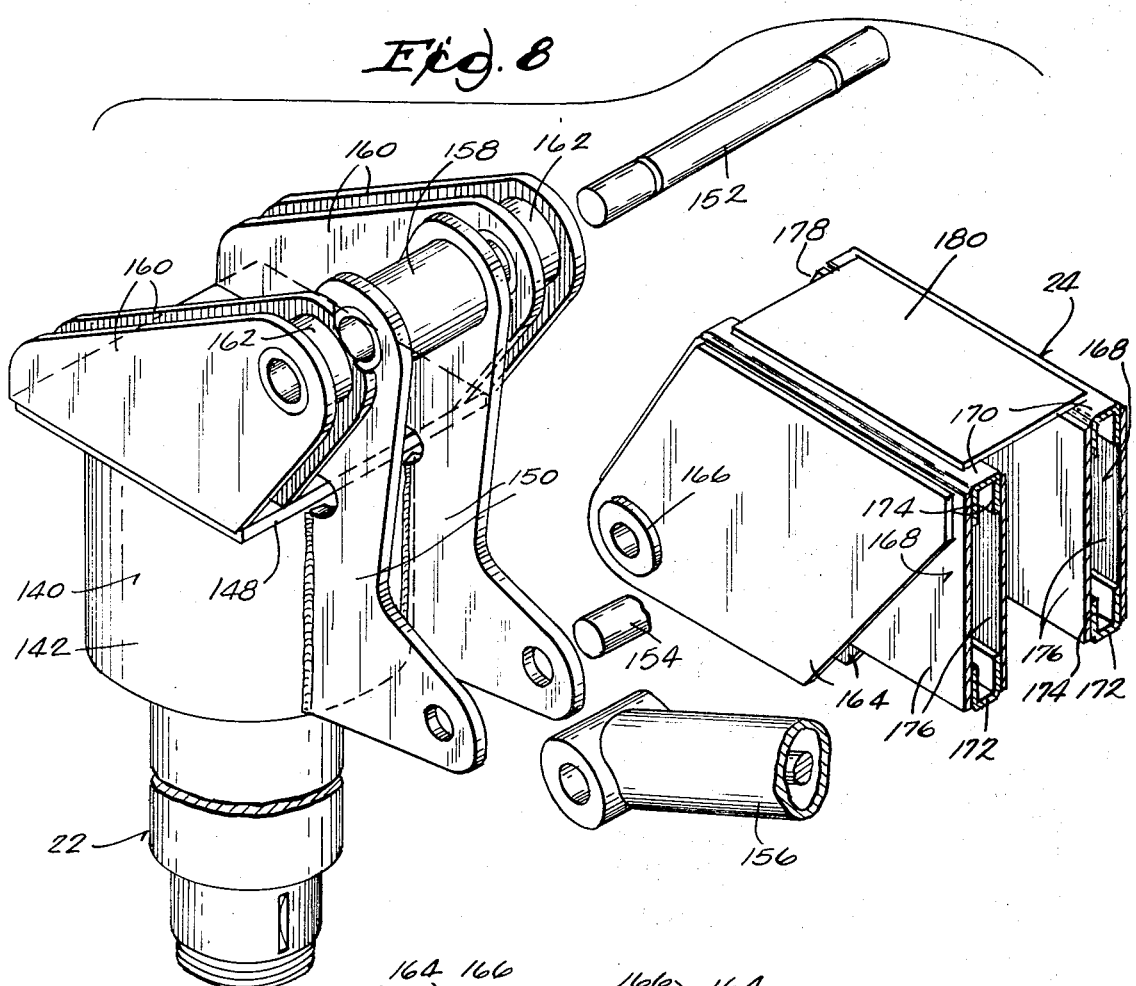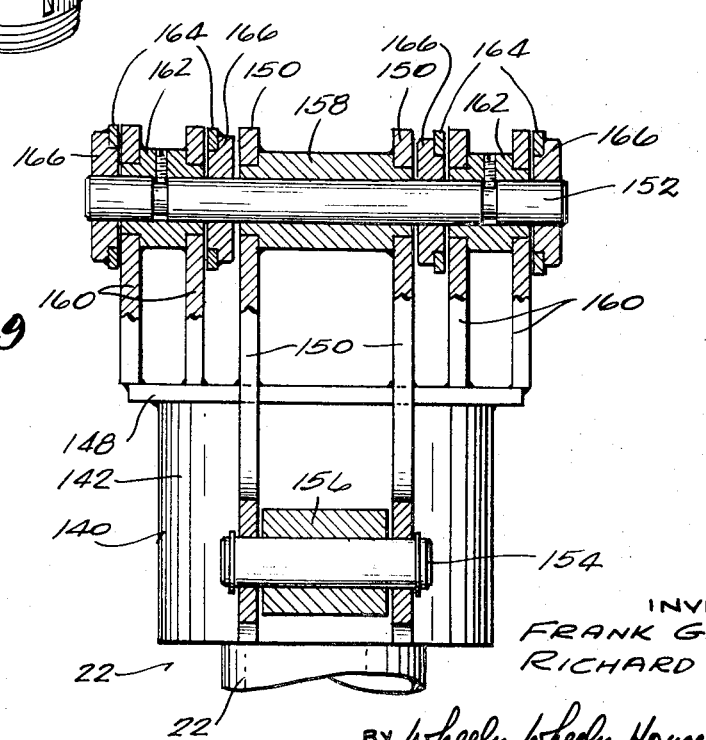

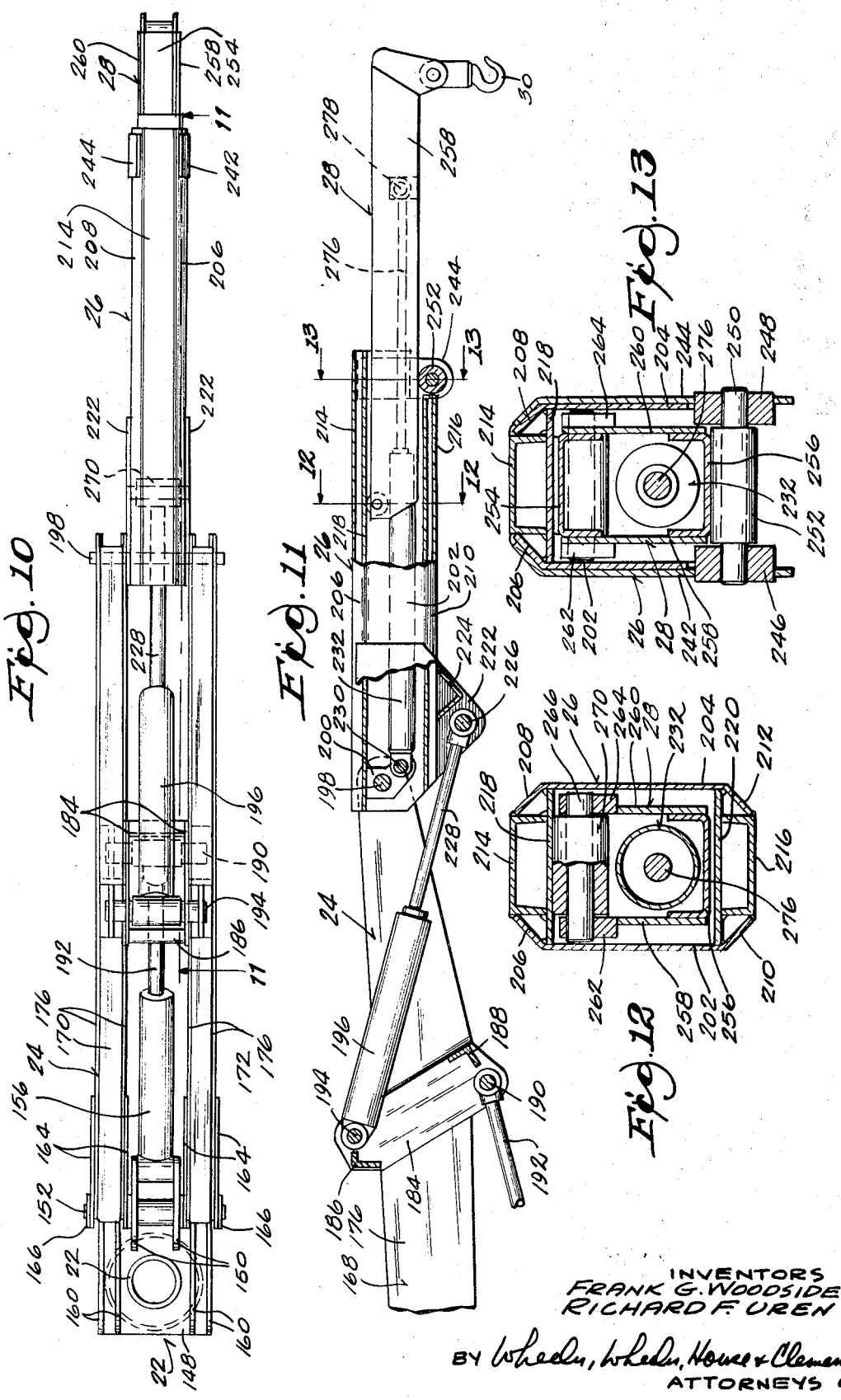

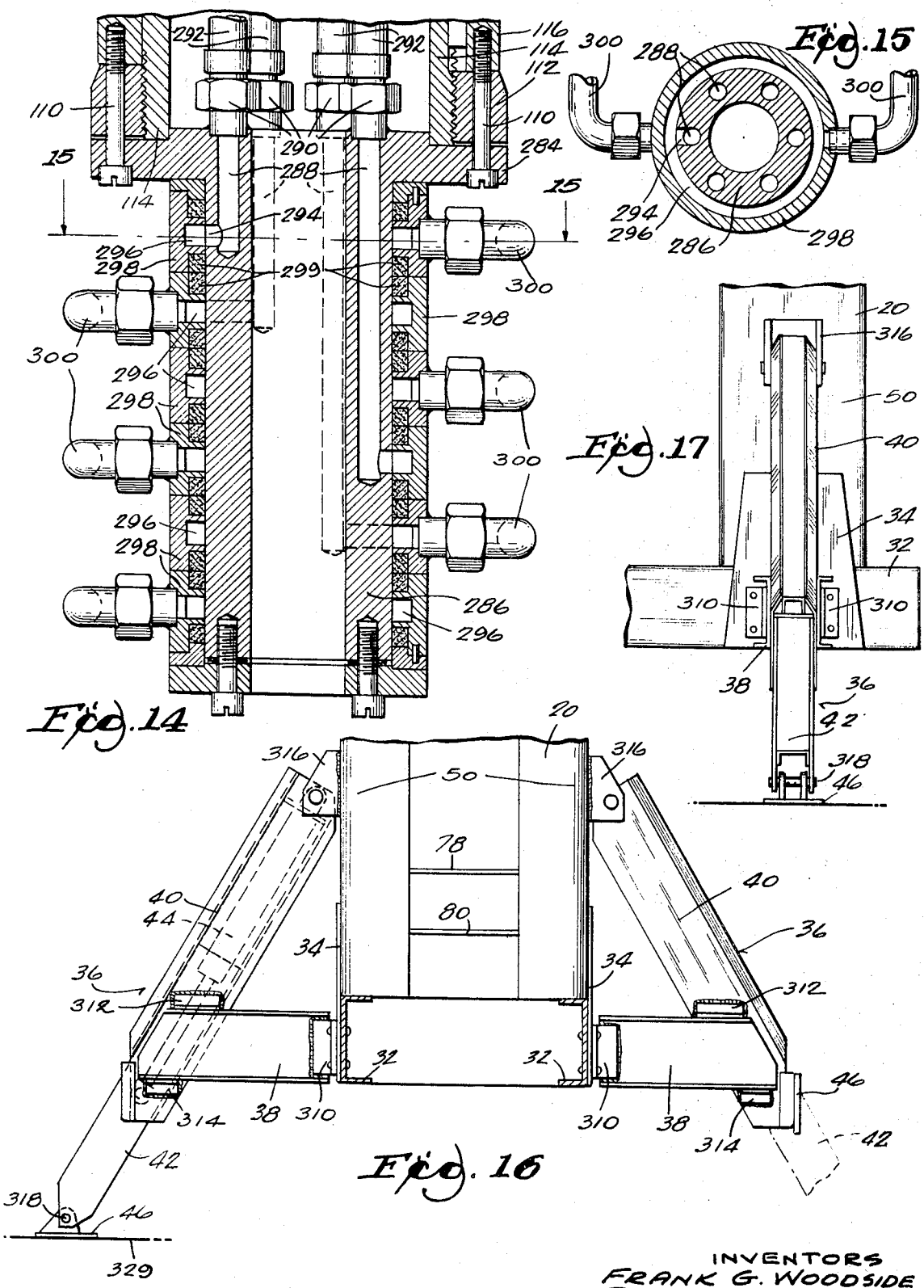

3,543,944

VEHICLE MOUNTED HOIST

BACKGROUND OF INVENTION

A hoist having a box frame and winch operated boom-actuating connections is shown in U.S. Pat. No. 2,923,418. The instant device completely eliminates any winch, all movements of the main boom and jib boom being individually hydraulically motivated. In addition, the accuracy of the bearings for the mast is greatly improved and the cost of production is greatly decreased by an arrangement in which all bearings are related to a core tube which is prefabricated and is then mounted unitarily as part of the frame.

Mast rotation for a full 360° is provided by a worm and worm gear arrangement, the relative movement of the various hydraulic connections being accommodated by a manifolding arrangement which is preferably below the mast bearings. The worm gear is adjustable on the mast to maintain perfect registration with the worm.

The boom and jib boom are of special design and have a unique mounting on the mast. The stabilizer legs have design features comparable to those of the boom and their connection with the frame and the vehicle contributes not only to the effectiveness of the legs but to the bracing of the frame of the hoist.

SUMMARY OF INVENTION

The invention comprises the special features to which reference has been made above, including:
1. The particular box section of the frame, which not only provides unusual strength but also provides storage reservoirs for the hydraulic liquid so that the hydraulic system is self-contained.
2. The provision in the hoist frame of a prefabricated core tube which is separately machined at minimum expense to position the mast bearings in inherent alinement, no machining of the rest of the frame being required.
3. Complete freedom of rotation of the mast in either direction and through any angle, an easily adjustable worm and worm gear set providing the motive power.
4. Swiveled manifolding providing connections to hydraulic hoses which lead from control valves to the various ram cylinders.
5. The provision at the top of the mast of a head fitting which provides a pintle for the boom and another pintle for the boom operating cylinder, these pintles being tied to each other as well as to the mast.
6. A unique box structure of the boom and jib boom and the respective stabilizer legs, giving great strength in relation to weight.

Details of these and other features will be elaborated upon in the following description of a preferred embodiment of the invention.

BRIEF DESCRIPTION OF DRAWINGS

FIG. 2 is an enlarged detail view in perspective fragmentarily showing a vehicle frame and a hoist frame mounted thereon, the prefabricated core tube of the hoist frame being shown separated from the rest of the frame and with a sidewall portion broken away FIG. 3 is a view taken in section on the line 3–3 of FIG. 2.

FIG. 4 is a view taken in section on the line 4–4 of FIG. 2.

FIG. 5 is a view taken in transverse vertical section through the frame portion of the hoist, the boom and its operating cylinder being fragmentarily illustrated.

FIG. 6 is a detail view taken in section on the line 6–6 of FIG. 5.

FIG. 7 is a fragmentary detail view taken in section on the line 7–7 of FIG. 6.

FIG. 8 is a view taken in section showing in mutually separated positions portions of the mast top fitting, with a fragment of the mast and the mounting for the mast operating ram.

FIG. 9 is a fragmentary detail view on an enlarged scale taken in section on line 9–9 of FIG. 5.

FIG. 10 is a plan view of the boom, jib, boom and extension.

FIG. 11 is a view taken in section on the line 11–11 of FIG. 10, parts of the boom and jib boom being broken away.

FIG. 12 is a view taken in section on an enlarged scale in the plane indicated by the line 12–12 of FIG. 11.

FIG. 13 is a view taken in section on an enlarged scale on the line 13–13 of FIG. 11.

FIG. 14 is an enlarged fragmentary detail view taken on the line 14–14 of FIG. 5.

FIG. 15 is a view in cross section taken on the line 15–15 of FIG. 14.

FIG. 16 is a view in transverse section through the vehicle frame and fragmentarily illustrating the hoist frame and stabilizing legs in rear elevation.

FIG. 17 is a fragmentary side elevation of the parts shown in FIG. 16.

DETAILED DESCRIPTION

General Organization

Figure 1:
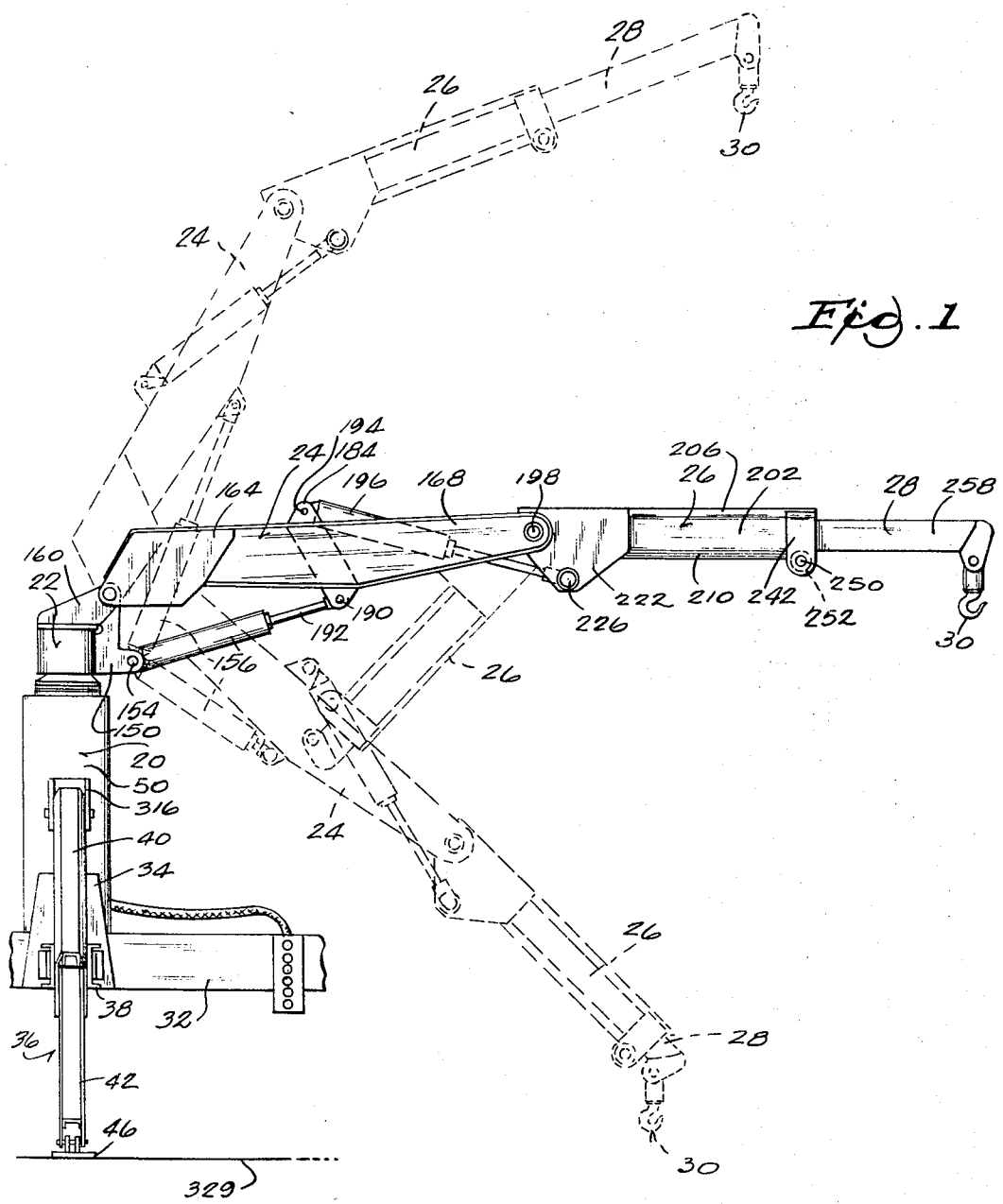
FIG. 1 is a view of the hoist in side elevation, a stabilizing leg being omitted and the vehicle frame only fragmentarily illustrated.

A hoist embodying this invention includes a box frame 20, a completely rotatable mast 22, a boom 24 pivoted to the mast, a jib boom 26 pivoted to the free end of boom 24 and a boom extension 28 for the work supporting hook 30. As shown in FIG. 1, the boom and jib boom extension are movable in a vertical plane through a wide range of angle. The main frame 20 of the hoist is mounted directly on the side members of the vehicle frame 32 as best shown in FIG. 2 and is anchored to the vehicle frame by side plates 34. It is also braced by the stabilizer legs 36. As best shown in FIG. 16, these legs comprise lateral arms 38 connected at their inner ends with the vehicle frame 32 and have their outer ends connected by brace members 40 with the hoist frame 20. The legs 42 are telescopically reciprocable in the brace members 40 and are extended and retracted by hydraulic rams 44. At their lower ends, the legs 42 have feet 46 which are pivoted and self-adjusting in engagement with the earth.

The details will now be described.

The Hoist Frame

As best shown in FIGS. 2, 3 and 4, the hoist frame 20 comprises side members 50 resting at their ends on the vehicle frame members 32 and extending upwardly in general parallelism. While it is not essential that the overall width of the hoist frame 20 should correspond with the width of the vehicle frame, it is advantageous that the outer surfaces of the side members 50 be in the plane of the corresponding surfaces of the frame members 32 so that the mounting plates 34 welded or otherwise secured to the hoist frame 20 will lap the vehicle frame members 32 and may be welded or otherwise fastened securely to the vehicle, the general arrangement being best shown in FIG. 2 and FIG. 16.

Each of the side members 50 has its side margins curved at 52 to provide flanges 54. The margins of these flanges are turned sharply inward at 56 to engage webs 58. These webs are welded at 60 to the respective side members and they are also welded at 62 to the margins of flanges 56. Inwardly of welds 62 the webs are mutually divergent at 64 and they have flanges 66 turned sharply inwardly and welded to a tube 70. This tube is preferably prefabricated to position the bearings for the mast 22 although it is a useful component of the frame even without using it to locate the mast bearings. The advantage of using it for locating the bearings is that the machining required is simple and inexpensive as compared with what it would cost to machine the frame as a whole.

Within the frame are cavities or compartments 72 and 74, respectively. In practice, these may be used as reservoirs for the oil or other fluid used in the ram pressure system by means of which the parts of the hoist are operated. However, the frame structure is inherently strong and has utility whether or not the cavities are so used.

The hoist frame 20 includes an upper deck 76, and an intermediate deck 78. The top deck 76 is welded to the upper margins of the side members 50, the inturned flanges thereof and all top portions of the webs 58. It therefore provides top closures for the reservoirs 72 and 74. The prefabricated bearing tube 70 extends through an appropriate opening 82 in the top deck and is welded to the deck.

The intermediate deck 78 extends through slots 84 in the flange portion 56 of the side members 50. It is welded to side members 50 and to the flanges thereof and to the lower margins of all portions of the webs 58 and also to the prefabricated bearing tube 70, thereby providing bottom closures for the oil reservoirs 72 and 74 (see FIGS. 2 and 5). It is customary to provide suitable access openings for filling and/or draining reservoirs.

The shelf 80 within frame 20 does not completely span the space between the side members 50. It is supported by bolts 86 screwed into a ring 88 welded to the lower end of the bearing tube 70 as best shown in FIG. 5. The housing 90 carried by the shelf member 80 provides an oil bath for the worm gear 92 mounted on the lower end of mast 22 in the manner hereinafter described. The worm gear 92 meshes with a worm 94 which is driven through reduction gearing from a motor 96 (preferably but not necessarily hydraulic). This gearing includes a worm 98 on the motor output shaft 100. The shaft 102 of the worm 94 carries a worm gear 104 with which the worm 98 meshes as best shown in FIG. 7 and FIG. 8. The bearings 106 and 108 for the mast driving worm 94 are fixed in the casing 90 and any required adjustment in level between the worm 94 and the worm gear 92 is effected by releasing the bolts 110 and rotating the ring nut 112 on its threaded connection with the driving sleeve 114 at the lower end of mast 22. The ring nut 112 supports the hub 116 of the worm gear 92 as clearly shown in FIGS. 5 and 14.

Mast Bearings

The mast 22 is provided with bearings on the prefabricated bearing tube 70 to simplify machining, to increase accuracy, and to avoid the expense of machining the whole hoist frame 20 to provide or mount such bearings. The bolts 86 which connect the plate 80 to the lower end of tube 70 also support a bushing 120 in which the lower end bearing 122 of mast 22 is rotatable. The upper end of the bearing tube 70, where it projects through the top member 76 of the hoist frame, is encircled by a ring 124 which is welded to the housing top plate 76 as shown in FIG. 5. Interiorly the bearing tube 70 is machined at 128 to receive and position the race 130 of a supporting thrust and radial bearing 131. Race 130 is bolted to the ring 124. The outer bearing race 134, which confines the bearing balls 136, encircles the mast 22 in supporting relation to a specially designed head 140 at the upper end of the mast.

The head 140 comprises a sleeve 142 spaced outwardly from the mast by means of upper and lower disks 144 and 146 mounted on the mast. Capping the sleeve 142 is a plate 148 welded to the upper end of the mast.

The accurate alinement of thrust bearing 131 at the upper end of the mast with bushing 120 at the lower end of the mast is assured in the prefabrication of tube 70 by simple and inexpensive machining of shoulder 128 at the top and internal ring or collar 88 which carries bushing 120 at the lower end of the bearing tube 70.

Boom Mounting

The mast head 140 has welded to its sleeve portion 142 a pair of brackets 150 which are spaced circumferentially of sleeve 142 and contribute to the support of the boom pintle 152. These brackets also carry the pintle 154 which is the sole support for the ram 156 which raises and lowers the boom (FIGS. 5, 8 and 9).

Connecting the brackets 150 at their upper ends is a sleeve 158 through which the pintle 152 passes.

In order further to stabilize the load bearing boom pintle 152, pairs of ears 160 are welded to the cap plate 148 of the mast head. The ears of each pair are connected by sleeves 162 into which pintle 152 is fitted. The boom 24 hereinafter described in detail has, at each side, pairs of mutually spaced side plates 164. At each side of the boom the plates 164 are mutually spaced to lie adjacent opposite sides of the ears 160 and are provided with bushings 166 bearing on the pintle 152.

Thus the boom bears on the extremities of the pintle as well as being supported therefrom at intermediate points, all points of pintle support being directly adjacent the ears 160 which are welded to the mast cap.

The intermediate bearing supports of the boom are also in immediate proximity to the brackets 150 which are not only welded to the mast cap along the sleeve 142 and the cap plate 148 but serve to connect the boom pintle 152 with the ram pintle 154 to locate these pintles accurately with reference to each other as well as to the mast.

The Main Boom

The boom 24 is shown in cross section in FIG. 8 to comprise side members 168 each of which has boxlike sections, comprising a downwardly opening upper channel 170 and an upwardly opening lower channel 172. The side flanges 174 of such channels may be connected by side plates 176 welded thereto. The load bearing end portion 178 of the boom is reinforced by applying the side plates 164 to respective side members 168, these being provided with said bushings 166 bearing on the boom pintle 152.

Spanning the pivoted end of the main boom 24 and welded to the top channels 170 of the respective side members 168 is a transverse plate 180 which, as shown in FIG. 8, may be relatively short, if desired. Intermediate the ends of the boom 24, the side members 168 have reinforcing plates 184 applied to the inner sides of each of the side plates 168 of boxlike side members 176. Upper and lower angles 186 and 188 span the space between these box members and are welded at their ends to the reinforcing plates 184 as best shown in FIGS. 10 and 11. The reinforcing plates extend above and below the respective side members 168 of the boom 24. Below the boom the reinforcing plates 184 provide support for the pintle 190 to which the connecting rod 192 of the ram 156 is attached. Above the boom is a similar pintle at 194 for ram 196 which operates the jib boom presently to be described.

A pintle 198 at the end of boom 24 supports the jib boom 26 for pivotal movement.

The Jib Boom

The jib boom 26 is pivoted at its rear end on the pintle 198 at the end of the main boom 24. The jib boom has a boxlike cross section comprising sides 202 and 204 (FIGS. 11, 12 and 13) with inwardly bent top flanges 206, 208, respectively, and corresponding inwardly bent bottom flanges 210, 212. These sides and flanges are welded to transverse plates 218 and 220 and to reinforcing channels 214 at the top and 216 at the bottom. The upper plate 218 provides a roller guideway for the boom extension as hereinafter described. As will be evident from FIG. 12, the entire structure is extremely strong.

Bracket plates 222 extending downwardly at the sides of the rear end portion of the jib 26 are braced by transverse angle 224 and support a pintle 226 to which the connecting rod 228 of the ram 196 is pivoted for the operation of the jib boom pivotally on pintle 198 with respect to the main boom 24.

Internally the brackets 200 of the main boom also support pintle mounting member 230 for the ram 232 which extends through the jib boom and reciprocates the boom extension 28.

Near its free outer end the jib boom 26 is reinforced by plates 242 and 244 applied to its side plates 202 and 204 as best shown in FIG. 13. These plates carry bearing blocks 246, 248 for the shaft 250 of a roller 252 upon which rides the intermediate portion of the extension boom 28. A roller 270 at the rear end of the extension boom rides against the upper plate 218 of the jib boom 24 as shown in FIGS. 11 and 12 and hereinafter described.

The Boom Extension

The boom extension 28 is rectangular in cross section and comprises upper channel 254 and lower channel 256 with interconnecting side plates 258 and 260 as best shown in FIGS. 11 and 13. Bearing blocks 262 and 264 respectively welded to the side plates 258, 260, support the spindle 266 for the rear roller 270 which rides on the under surface of plate 218. The intermediate portion of the lower surface of channel 256 rides on the terminal roller 252 as shown in FIGS. 11 to 13. Thereby the extension 28 is guided for reciprocable movement in and out with respect to the jib boom 26, while a load may be supported by the hook 30 at its outer free end. The ram 232 has its connecting rod 276 attached by means of pintle 278 (FIG. 11) to the extension 28 for reciprocating it forth and back through the jib boom 26.

Fluid Ram-Operating Connections

As already stated, the mast 22 is freely rotatable through any desired angle or number of rotations.

Reference has been made to the bolts 110 which position the ring nut 112 and support the hub 116 of the driving worm gear for rotation of the mast. The same bolts 110 also carry the top flange 284 on the fluid distributor sleeve 286 (FIG. 14). Thus this sleeve is constrained to rotate with the mast. Within it are numerous axial bores 288 in a number appropriate for connection by means of fittings 290 with the various pipes 292 which comprise in any desired number Within operating connections to the various rams.

From each of the bores 288 in the distributor sleeve 286, a radial port 294 leads laterally and communicates with a manifold channel 296 in a ring 298. There are as many rings as there are bores so that in the event an additional bore is provided it is a simple matter to use a longer sleeve 286 and add an additional manifold channel 296. FIGS. 5 and 14 show six rings 298, each with its own channel 296, and each served by an appropriate fluid pressure or relief line 300 placing the several bores 298 and the pipes 292 within the mast in communication with solenoid operated control valves 302 which are also six in number to control the six lines needed for the three rams which actuate the boom, the jib boom and the extension in this particular device. As best shown in FIG. 14, the inner periphery of each of the rings 298 is closely fitted to the distributor sleeve 286 and each ring is shouldered on both sides of its channel 296 to receive packing 299.

While the valves could be manually or fluid operated, I have shown in FIG. 5 valve operating solenoids at 306 operated by current supplied through cable 308. It will be apparent that in any position of the mast, and through out any desired extent of mast rotation, the several rams mounted at the top of the mast will be in continuous communication through the distributor sleeve 286 and the coacting manifold rings 298 with the respective control valves. These may be operated directly and manually or may be programed or may be operated remotely by power, as desired.

It will be obvious to anyone skilled in the art that the several valves 302 constitute pressure sources which can be supplied with fluid under pressure from any desired point and in any desired manner. For example, I have shown diagrammatically in FIG. 5 an electric motor 320 driving a pump 322 which has an inlet connection 324 from the reservoir 74 and an outlet connection fragmentarily illustrated at 326 and leading to such of the valves 302 as control pressure. Such of the valves 302 as handle return fluid may connect through pipe 328 with reservoir 72. The two reservoirs may be connected with each other as indicated by pipe 330 in FIG. 3. All of these details are optional.

Stabilizers

It is convenient to use the mounting plates 34 for frame 20 as supports for brackets 310 for the laterally projecting arms 38 which cooperate with the upper stabilizer members 40 to brace the frame 20. The general arrangement is shown in FIGS. 16 and 17. Preferably, the upper members 40 of the stabilizer legs have a boxlike structure comparable to that of the boom and jib boom as shown in FIGS. 12 and 13. The leg extension members 42 are comparable to the boom extension 28, being reciprocable by rams 44 on ways provided by the upper leg members 40. An operative position is shown at the left in FIG. 16 and a retracted position is shown at the right. The arms 38 have upper and lower fittings 312 and 314 fastened to the sides of the upper leg members 40 (FIG. 17). The top ends of leg members 40 may be connected pivotally to brackets 316 welded to the sides 50 of frame 20.

The feet 46 at the lower ends of the leg extensions 42 are pivoted at 318. They conform to the ground when the extensions are lowered at the ground level indicated at 320 in FIG. 16. When the extension is retracted, the foot may engage the end of arm 38 to pivot to the position shown in full lines at the right in FIG. 16.

We claim:

1. A hoist comprising a hoist frame, an upright mast rotatable with respect thereto, boom means extending laterally from the mast and supported thereon and a tube mounted on said frame and through which the mast extends, and means on the frame for positioning the tube, said mast being provided with bearings supporting it and providing for rotative movement, the tube having vertically spaced machined surfaces for the location of such bearings independently of the rest of the frame, the mast having a worm gear and the frame providing bearings in which there is mounted a worm meshing with said gear, said worm having means for operating it for free rotation of said mast and boom means and the frame includes means providing a vat for lubricant for the lubrication of the worm and worm gear aforesaid and the mast has means for adjustment of the worm gear axially of the mast for maintaining registration between the worm gear and worm notwithstanding wear of mast bearing means which support the mast and with which said frame is provided.

2. A hoist comprising a hoist frame, an upright mast rotatable with respect thereto, boom means extending laterally from the mast and supported thereon by a transverse fulcrum and a tube mounted on said frame and through which the mast extends, and means on the frame for positioning the tube, said mast being provided with bearings supporting it and providing for rotative movement, the tube having vertically spaced machined surfaces for the location of such bearings independently of the rest of the frame, the mast having a head, bracket means in permanent connection with the head and upon which the said transverse fulcrum for the boom means is carried above the mast, said bracket means extending downwardly along the mast from said transverse fulcrum, a second transverse fulcrum carried by the bracket means below the first mentioned transverse fulcrum and connected through the bracket means with the first transverse fulcrum and with the mast head, and a ram having pivotal connection with the second transverse fulcrum and with a point on the boom means remote from the first transverse fulcrum, the mast head including a sleeve generally concentric with the mast, and a cap plate connected with the mast and with the sleeve, the bracket means comprising a pair of bracket members laterally spaced upon the plate and connected therewith and with said sleeve.

3. A hoist according to claim 2 in which the cap plate is further provided with spaced ears laterally offset at opposite sides of the bracket means, the bracket means and ears being provided with alined apertures through which extends a pintle providing the first mentioned transverse fulcrum.

4. A hoist according to claim 3 in which the boom means comprises spaced side members having apertured flanges transversely apertured and through which the pintle extends, said flanges embracing said ears.